(12) United States Patent
Zhu

(10) Patent No.: US 12,334,109 B2
(45) Date of Patent: Jun. 17, 2025

(54) VIDEO PROCESSING CIRCUIT AND ASSOCIATED VIDEO PROCESSING METHOD

(71) Applicant: SigmaStar Technology Ltd., Fujian (CN)

(72) Inventor: Xiao-Ding Zhu, Shanghai (CN)

(73) Assignee: SIGMASTAR TECHNOLOGY LTD., Fujian (CN)

( * ) Notice: Subject to any disclaimer, the term of this patent is extended or adjusted under 35 U.S.C. 154(b) by 232 days.

(21) Appl. No.: 18/182,517

(22) Filed: Mar. 13, 2023

(65) Prior Publication Data

US 2024/0119966 A1 Apr. 11, 2024

(30) Foreign Application Priority Data

Oct. 11, 2022 (CN) .......................... 202211243290.3

(51) Int. Cl.
 *G11B 20/10* (2006.01)
 *G11B 20/00* (2006.01)

(52) U.S. Cl.
 CPC .. *G11B 20/10527* (2013.01); *G11B 20/00007* (2013.01); *G11B 2020/00072* (2013.01); *G11B 2020/10666* (2013.01)

(58) Field of Classification Search
 CPC .................... G11B 20/10527; G11B 20/00007
 See application file for complete search history.

(56) References Cited

U.S. PATENT DOCUMENTS

| | | | |
|---|---|---|---|
| 2015/0243291 A1* | 8/2015 | Shirahama | G10L 13/02 704/500 |
| 2017/0094191 A1* | 3/2017 | Hashizume | H04N 25/42 |
| 2018/0070126 A1* | 3/2018 | Martel | H04L 65/80 |

* cited by examiner

*Primary Examiner* — Mishawn N. Hunter
(74) *Attorney, Agent, or Firm* — Edell, Shapiro & Finnan, LLC

(57) ABSTRACT

The present invention discloses a video processing circuit, which is coupled to a memory chip and includes an image processing circuit. The image processing circuit includes a first channel, a second channel and a compression circuit. The two channels process first image data and second image data to generate first processed image data and second processed image data, respectively. The compression circuit compresses the first processed image data and the second processed image data to generate first compressed image data and second compressed image data, respectively. A memory block in the memory chip is configured as a ring buffer shared by the first channel and the second channel so as to store the first compressed image data and the second compressed image data.

11 Claims, 4 Drawing Sheets

Information: status, frame index, channel index

VIDEO PROCESSING CIRCUIT AND ASSOCIATED VIDEO PROCESSING METHOD

CROSS-REFERENCE TO RELATED APPLICATION

This application claims the benefit of China application Serial No. CN202211243290.3, filed on Oct. 11, 2022, the subject matter of which is incorporated herein by reference.

BACKGROUND OF THE INVENTION

Field of the Invention

The present invention relates to a video processing circuit and an associated video processing method.

Description of the Related Art

In a current video signal processing circuit, due to a huge amount of data of each frame and a large frame rate, an extremely large memory space is needed to store the data. To overcome the issue of memory requirement, a ring buffer is used in the prior art to continuously buffer frame data output from a front-end circuit. When such ring buffer is used, the required memory space may be reduced to a data amount of one frame or even to less than a data amount of one frame. However, in certain applications, if a video processing circuit needs to generate frame data of multiple channels and these channels individually have different resolutions or frame rates, each of these channels needs to be provided to have a corresponding ring buffer in terms of circuit design. As a result, the required memory space still cannot be effectively reduced.

SUMMARY OF THE INVENTION

Therefore, it is an object of the present invention to provide an image processing circuit capable of saving memory space. The image processing circuit is capable of effectively reducing the required memory space so as to overcome the issues of the prior art.

A video processing circuit disclosed in one embodiment of the present invention is coupled to a memory chip and includes an image processing circuit. The image processing circuit includes a first channel, a second channel and a compression circuit. The first channel and the second channel share an input port, and process first image data and second image data to generate first processed image data and second processed image data, respectively. The compression circuit compresses the first processed image data and the second processed image data to generate first compressed image data and second compressed image data, respectively. A memory block in the memory chip is configured as a ring buffer shared by the first channel and the second channel so as to store the first compressed image data and the second compressed image data.

A video processing method disclosed in one embodiment of the present invention is applied to a video processing circuit that is coupled to a memory chip. The video processing method includes: processing first image data by a first channel of an image processing circuit to generate first processed image data, and processing second image data by a second channel of the image processing circuit to generate second processed image data, wherein the first channel and the second channel share an input port; compressing the first processed image data and the second processed image data to generate first compressed image data and second compressed image data, respectively; and storing the first compressed image data and the second compressed image data to a ring buffer. A memory block in the memory chip is configured as a ring buffer shared by the first channel and the second channel so as to store the first compressed image data and the second compressed image data.

BRIEF DESCRIPTION OF THE DRAWINGS

To better describe the technical solution of the embodiments of the present application, drawings involved in the description of the embodiments are introduced below. It is apparent that, the drawings in the description below represent merely some embodiments of the present application, and other drawings apart from these drawings may also be obtained by a person skilled in the art without involving inventive skills.

DETAILED DESCRIPTION OF THE INVENTION

Figure 1:
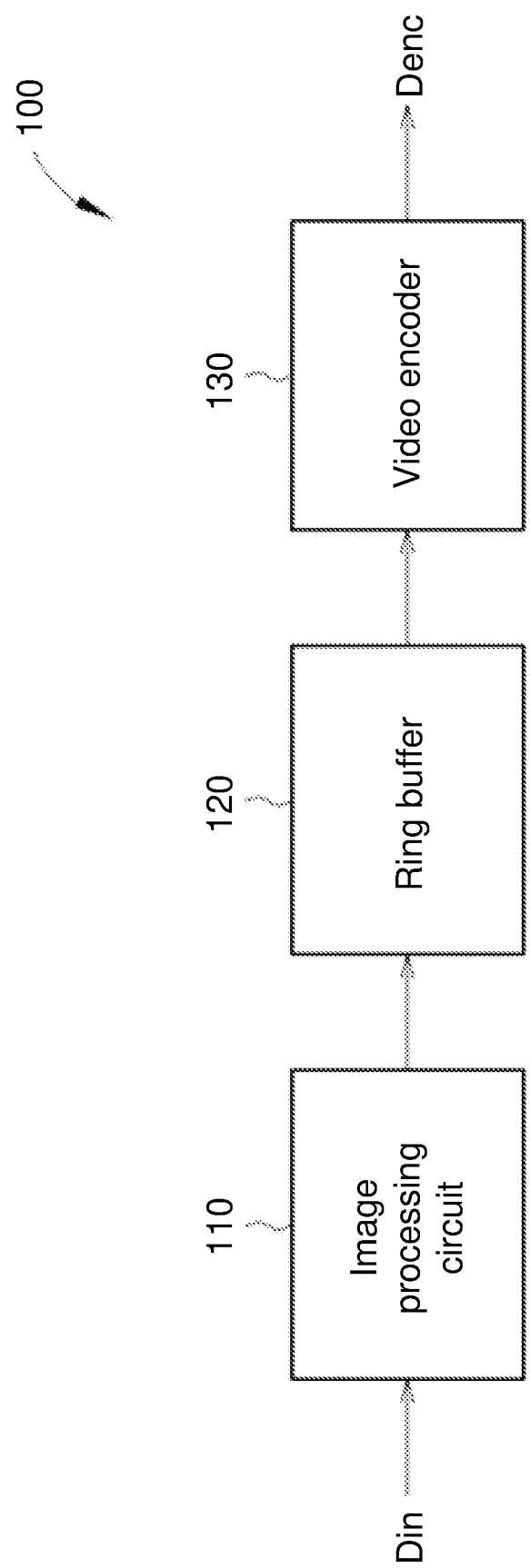
FIG. 1 is a schematic diagram of a video processing circuit according to an embodiment of the present invention.

FIG. 1 shows a schematic diagram of a video processing circuit 100 according to an embodiment of the present invention. As shown in FIG. 1, the video processing circuit 100 includes an image processing circuit 110, a ring buffer 120 and a video encoder 130. In this embodiment, the video processing circuit 100 is applicable to an image capturing device to receive image data Din sensed by an image sensor, and to process and encode the image data to generate encoded image data Denc to a back-end circuit for storage or further transmission. In one embodiment, the image processing circuit 110 and the video encoder 130 are arranged on a same chip, and the ring buffer 120 may be implemented by a dynamic random access memory (DRAM) and be arranged on another chip. The ring buffer 120 may be a specific block of a DRAM to store image data having been processed by the video processing circuit 100.

Figure 2:
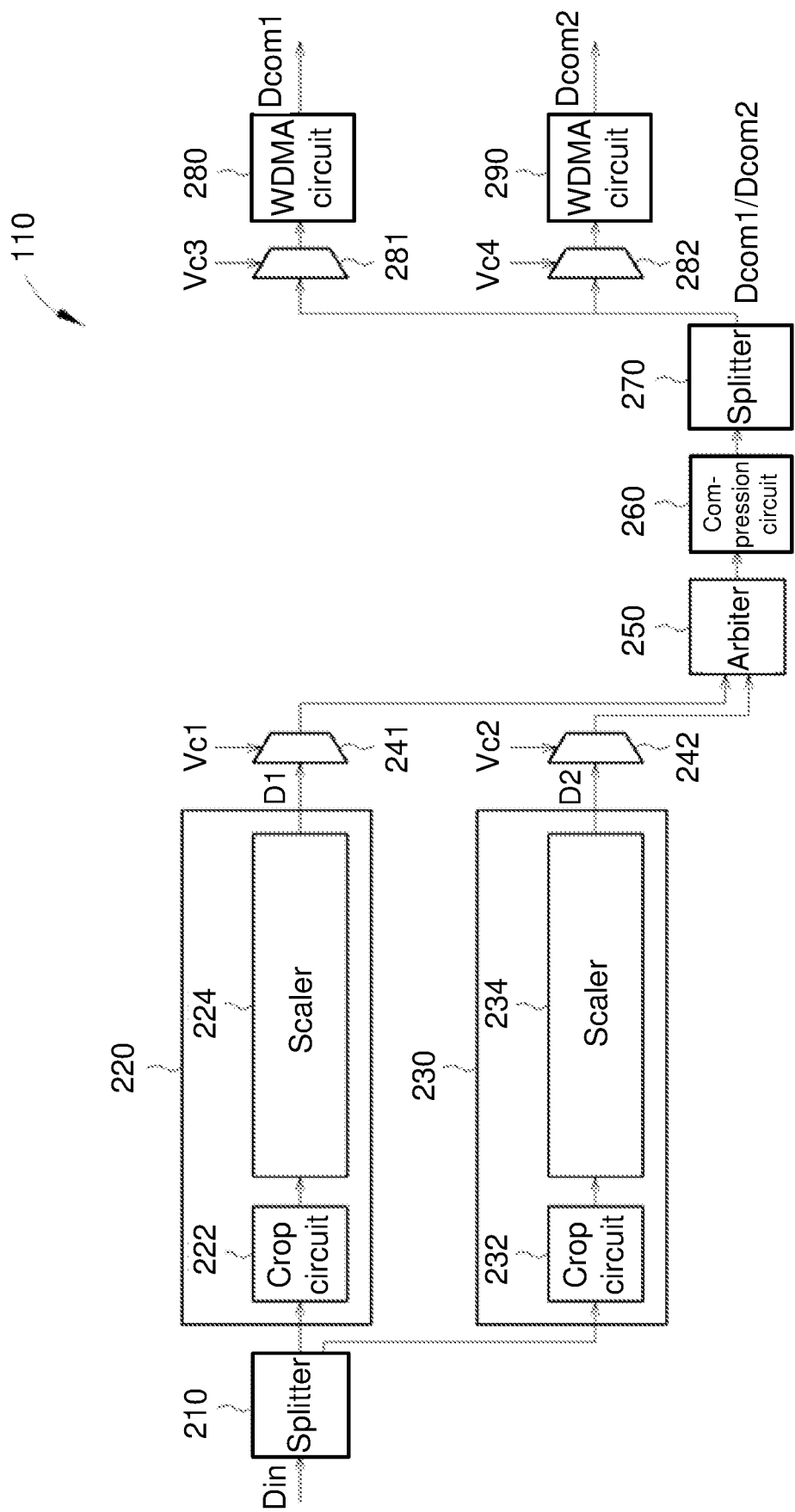
FIG. 2 is a schematic diagram of an image processing circuit according to an embodiment of the present invention.

FIG. 2 shows a schematic diagram of the image processing circuit 110 according to an embodiment of the present invention. As shown in FIG. 2, the image processing circuit 110 includes a splitter 210, a first channel 220, a second channel 230, selection circuits 241 and 242, an arbiter 250, a compression circuit 260, a splitter 270, selection circuits 281 and 282, and write direct memory access (WDMA) circuits 280 and 290. The first channel 230 includes a crop circuit 222 and a scaler 224. The second channel 230 includes a crop circuit 232 and a scaler 234.

In the operation of the image processing circuit 110, the splitter 210 first receives the image data Din and divides the image data Din to the first channel 220 and the second channel 230. In one embodiment, the splitter 210 receives the image data Din through one single port, and each of the first channel 220 and the second channel 230 receives the complete image data Din. Next, regarding the operation of the first channel 220, the crop circuit 220 crops frames in the image data Din to preserve the required regions and transmits data of the required regions to the scaler 224. The scaler 224 performs image scaling on the data of the required regions to generate and transmit processed image data D1 to the selection circuit 241. For example, the scaler 224 may include a plurality of scaling units, and may first perform image upscaling in the vertical direction on the received data to generate vertically upscaled image data to a line buffer, and then perform image upscaling in the horizontal direction on the vertically upscaled image data to generate the processed image data D1. The operation details of the second channel 230 is similar to that of the first channel 220, and are thus omitted herein. In practice, the cropping and/or scaling performed by the first channel 220 on the image data Din is different from that by the second channel 230. For example, the scaling ratio applied on the image data Din by the first channel 220 is different from the scaling ratio applied on the image data Din by the second channel 230. It should be noted that, the operation details and operation orders of the first channel 220 and the second channel 230 are given as examples for illustration purposes and are not to be construed as limitations to the present invention.

Next, the selection circuit 241 may transmit the processed image data D1 to the arbiter 250 at an appropriate timing according to a control signal Vc1, and the selection circuit 242 may transmit the processed image data D2 to the arbiter 250 at an appropriate timing according to a control signal Vc2. In one embodiment, the selection circuit 241 and the second selection circuit 242 in overall may be implemented by a multiplexer. The arbiter 250 may be a 2-to-1 arbiter that selects one of the outputs from the selection circuits 241 and 242 as an input to the compression circuit 260. The compression circuit 260 may be a compression circuit in any form, for example, a circuit adopting an ARM Frame Buffer Compression (AFBC) compression mechanism, to compress the processed image data D1 and D2 in an alternate manner to generate compressed image data Dcom1 and Dcom2, respectively. Then, the splitter 270 transmits the compressed image data Dcom1 to the WDMA circuit 280 through the selection circuit 281 controlled by a control circuit Vc3 to write the compressed image data Dcom1 to the ring buffer 120. Similarly, the splitter 270 transmits the compressed image data Dcom2 to the WDMA circuit 290 through the selection circuit 282 controlled by a control signal Vc4 to write the compressed image data Dcom2 to the ring buffer 120. That is to say, the compressed image data Dcom1 generated after processing by the first channel 220 and the compressed image data Dcom2 generated after processing by the second channel 230 share the ring buffer 120.

The operations of the selection circuits 241 and 242, the arbiter 250, the compression circuit 260, the splitter 270, and the selection circuits 281 and 282 may be regarded as time-division multiplexed processing on the processed image data D1 and D2; that is, the processed image data D1 and D2 are processed alternately by the compression circuit 260 to generate the corresponding compressed image data Dcom1 and Dcom2, respectively, which are to be stored to the ring buffer 120.

In the image processing circuit 110, by compressing the processed image data D1 and D2 to generate the compressed image data Dcom1 and Dcom2 having smaller sizes, the ring buffer 120 is allowed to store a larger number of sets of the image data, or the ring buffer 120 may be designed with a smaller capacity, thereby satisfying requirements. Moreover, by processing the processed image data D1 and D2 using a time-division multiplexed technique, an intended function can be achieved with one compression circuit, hence reducing hardware manufacturing costs.

Figure 3:
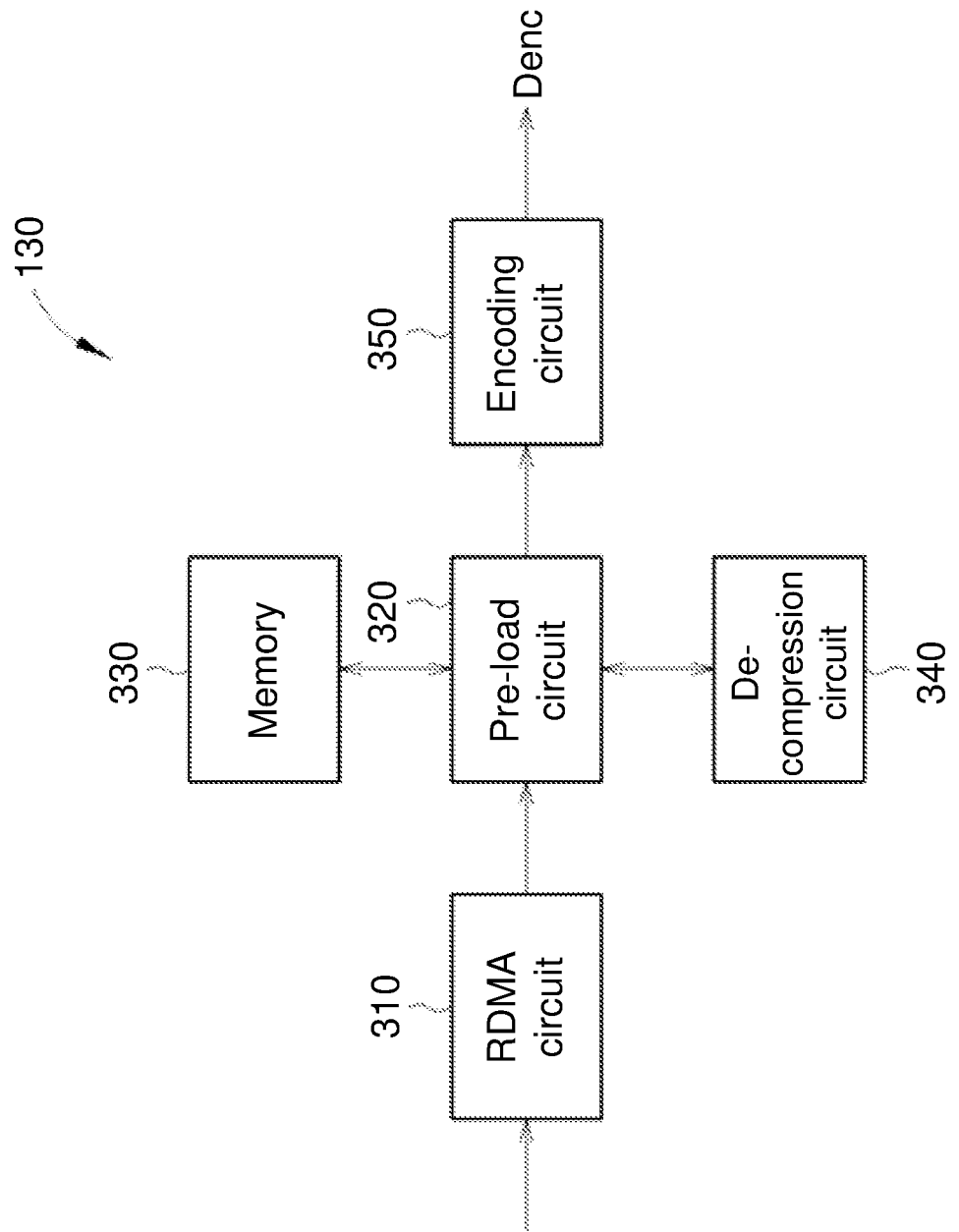
FIG. 3 is a schematic diagram of a video encoder according to an embodiment of the present invention.

FIG. 3 shows a schematic diagram of the video encoder 130 according to an embodiment of the present invention. As shown in FIG. 3, the video encoder 130 includes a read direct access memory (RDMA) circuit 310, a pre-load circuit 320, a memory 330, a decompression circuit 340 and an encoding circuit 350. In the operation of the video encoder 130, the RDMA circuit 310 reads the compressed image data Dcom1 and Dcom2 previously written by the image processing circuit 110 from the ring buffer 120, and temporarily stores the compressed image data Dcom1 and Dcom2 to the memory 330 through the pre-loading circuit 320. The decompression circuit 340 may be a decompression circuit corresponding to the compression circuit 260, for example, a decompression circuit adopting an AFBC mechanism, to decompress the compressed image data Dcom1 and Dcom2 through the pre-load circuit 320 so as to generate decompressed image data. Next, the encoding circuit 350 encodes the decompressed image data by, for example, encoding compliant to the H.264 or H.265 of High Efficiency Video Coding, so as to generate encoded image data Denc.

In order to reliably reduce the size of the ring buffer 120 without undesirably affecting the operations of the image processing circuit 110 and the video encoder 130 and to have the compressed image data Dcom1 and Dcom2 share the ring buffer 120, data processing and transmission of the image processing circuit 110 and the video encoder 130 need to be efficiently controlled; that is, data having been processed by a previous circuit needs to be quickly forwarded to a next circuit for processing, with the specific details to be described below.

In one embodiment, the video processing circuit 110 configures a memory block of a memory chip as the ring buffer 120 by using of some global registers, wherein the content stored in the global registers include a starting address of the ring buffer 120, the size of the ring buffer 120, the number of entries in the ring buffer 120, a current write pointer of the ring buffer 120 and a current read pointer of the ring buffer 120. When the WDMA circuits 280 and 290 write the compressed image data Dcom1 and Dcom2 to the ring buffer 120, respectively, the WDMA circuits 280 and 290 also establish a write data table according to the content of the global registers so as to record information of the data written to the ring buffer 120. Taking FIG. 4 as an example for illustration, it is assumed that the WDMA circuits 280 and 290 establish information of an entry in a write data table 400 while writing compressed image data corresponding to a frame to the ring buffer 120. Thus, when the WDMA circuits 280 and 290 write compressed image data corresponding to a first frame to the ring buffer 120, the WDMA circuits 280 and 290 establish, in an entry 0 in the write data table 400, a starting address of the compressed image data of the first frame in the ring buffer 120, the size of the compressed image data of the first frame and related information of the first frame, wherein the related information includes a status (for example, a default status, currently being written or have been written) of the compressed image data of the first frame, a frame index of the first frame, and a channel index (corresponding to the first channel 220 or the second channel 230). The frame index is used to identify a corresponding frame (for example, a frame serial number), and the channel index is used to identify a corresponding channel. Since the ring buffer 120 is shared by the first channel 220 and the second channel 230, by recording the frame index and the channel index of each frame in each entry, the video encoder 130 is enabled to accordingly identity and read the data stored in the ring buffer 120.

Similarly, when the WDMA circuits 280 and 290 write compressed image data corresponding to a second frame, a third frame and a fourth frame to the ring buffer 120, the WDMA circuits 280 and 290 record, in entries 1, 2 and 3 in the write data table 400, starting addresses of the compressed image data of the second frame, the third frame and the fourth frame in the ring buffer 120, the sizes of the compressed image data and related information of the compressed image data, respectively. Next, when the WDMA circuits 280 and 290 write compressed image data corresponding to a fifth frame to the ring buffer 120, the WDMA circuits 280 and 290 record, in the entry 0 of the write data table 400, information of the fifth frame to overwrite the previously stored information of the first frame.

In one embodiment, the write data table 400 may be stored in a first register of corresponding to the WDMA circuits 280 and 290, and the first register may be formed by a plurality of register units to store a plurality of entries written to the write data table 400. The RDMA circuit 310 in the video encoder 130 may establish a read data table to record information of data read from the ring buffer 120, wherein the read data table may be stored in a second register that may be similarly formed by register units. In practice, the read data table may include only one entry, and so the number of register units in the second register is less than that of the register units in the first register, so as to reduce hardware costs of the second register.

In one embodiment, the data of the entries of the write data table 400 in the first register may be transmitted to the read data table in the second register by means of a mechanism, thus the video encoder 130 accordingly reads the image data in the ring buffer 120. In one embodiment, the first register and the second register are connected by an exclusive hardware line; that is, the process of obtaining the write data table 400 for the video encoder 130 does not involve the control of a central processor or software. Taking FIG. 5 as an example for illustrations, the image processing circuit 110 may include a multiplexer 510, which sequentially selects the entry 0, entry 1, entry 2 and entry 3 according to a selection signal Vs, and then again selects the entry 0, entry 1, entry 2, entry 3 . . . and so forth, so as to transmit the starting addresses, sizes and information of the corresponding frames to the video encoder 130. Moreover, in one embodiment, the selection signal Vs is generated by the video encoder 130 and is a clock signal having a predetermined frequency. The video encoder 130 may select an entry in the write data table 400 according to the selection signal Vs, and the multiplexer 510 may transmit the content of one entry to the second register when triggered by a rising edge of the selection signal Vs. That is, within a period of one clock signal, the video encoder 130 is enabled to obtain the information of one entry from the write data table 400 to the read data table.

After receiving the starting address, size and information carried in one entry, for example, the starting address, size and related frame information of the compressed image data of the first frame carried in the entry 0, the video encoder 130 may learn information including the address of the compressed image data of the first frame in the ring buffer 120, and the corresponding frame serial number and channel according to the content of the entry 0, and read the compressed image data of the first frame from the ring buffer 120, for subsequent operations. In another embodiment, after reading a plurality of entries of the write data table 400, the video encoder 130 may determine an encoding flow for the compressed image data in the ring buffer 120 according to the content of the plurality of entries.

Figure 4:
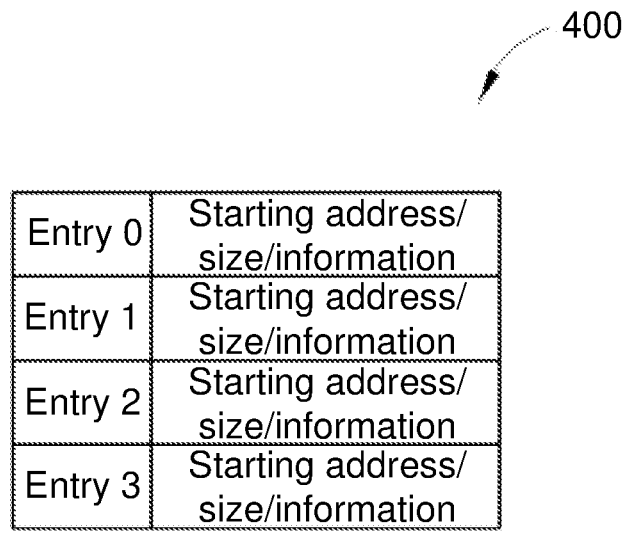
FIG. 4 is a schematic diagram of a write data table according to an embodiment of the present invention.
Figure 5:
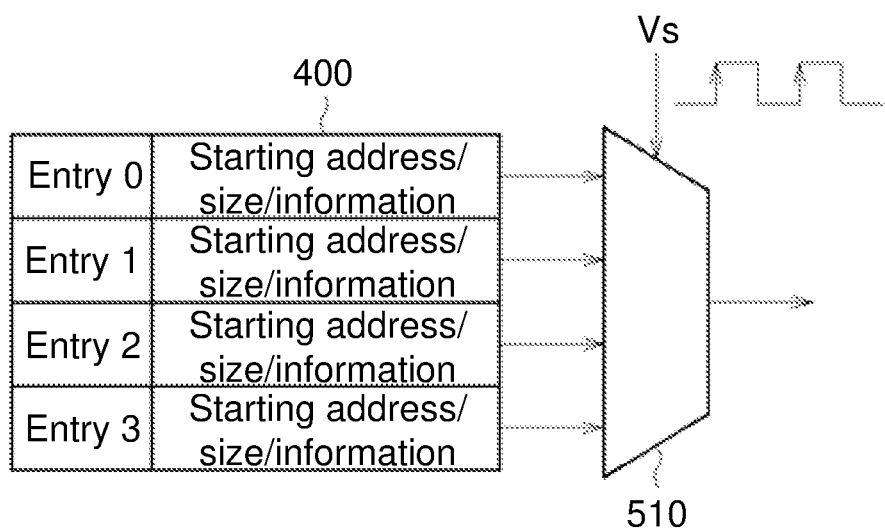
FIG. 5 is a schematic diagram of sequentially transmitting entries of a write data table by a multiplexer to a video encoder according to an embodiment of the present invention.

In the embodiments in FIG. 4 and FIG. 5, by transmitting the data of the write data table 400 to the second register corresponding to the video encoder 130, the video encoder 130 is enabled to quickly read the required data from the ring buffer 120. Moreover, with the multiplexer 510, data of different entries can be sequentially transmitted to the video encoder 130 by needing only one hardware line, hence reducing hardware costs.

In one embodiment, since the image data Din includes data of luminance (Y) and chroma (UV), the ring buffer 120 may include a first ring buffer and a second ring buffer, wherein the first ring buffer is used to store compressed luminance data and the second ring buffer is used to store compressed chroma data. At this point, in the embodiments in FIG. 4 and FIG. 5, the starting address, size and information carried in each entry of the write data table 400 may include a starting address of the compressed luminance data in the first ring buffer, a size of the compressed luminance data and information of the compressed luminance data, as well as a starting address of the compressed chroma data in the second ring buffer, a size of the compressed chroma data and information of the compressed chroma data. The information of the compressed luminance data includes a status (for example, a default status, currently being written or have been completely written) of the compressed luminance data, and associated frame index and channel index, and the information of the compressed chroma data includes a status (for example, a default status, currently being written or have been completely written) of the compressed chroma data, and associated frame index and channel index. In another embodiment, since the image data Din may further include data of a luminance header and a chroma header, in addition to the first ring buffer and the second ring buffer above, the ring buffer 120 may further include a third ring buffer and a fourth ring buffer, wherein the third ring buffer is used to store compressed luminance header data and the fourth ring buffer is used to store compressed chroma header data. At this point, in the embodiments in FIG. 4 and FIG. 5, the starting address, size and information carried in each entry in the write data table 400 include a starting address of the compressed luminance header data in the third ring buffer, a size of the compressed luminance header data and information of the compressed luminance header data, as well as a starting address of the compressed chroma header data in the fourth ring buffer, a size of the compressed chroma header data and information of the compressed chroma header data. As described above, with the content of each entry of the write data table 400, the video encoder 130 is enabled to obtain related information of luminance and chroma data all at once, thereby improving read efficiency of the video encoder 130.

It should be noted that, in the embodiment in FIG. 1, the image processing circuit 110 writes the compressed image data to the ring buffer 120 for the use by the video encoder 130; however, the present invention is not limited to the examples above. In other embodiments of the present invention, the video encoder 130 may be replaced by other back-end circuits, for example, a back-end image processing circuit. These design modifications are considered to be encompassed within the scope of the present invention.

In summary, in the video processing circuit of the present invention, by compressing processed image data of a plurality of channels and by sharing the same ring buffer among the plurality of channels, the ring buffer is enabled to store a larger number of sets of image data or the ring buffer may be designed with a smaller capacity to thereby be sufficient to satisfy requirements. Moreover, by compressing the processed image data using a time-division multiplexed technique, an intended function can be achieved with one compression circuit, hence reducing hardware manufacturing costs. Moreover, a write data table is additionally established in one embodiment of the present invention. The write data table includes the starting address, size, status, frame index and channel index of the compressed image data of each frame in the ring buffer, and each entry in the write data table may be transmitted to a back-end circuit through a multiplexer, allowing efficient reading of the required data from the ring buffer.

The description above provides merely preferred embodiments of the present application, and all variations and modifications made based on the range of claims of the present application are to be encompassed within the scope of the present application.

What is claimed is:

1. A video processing circuit, coupled to a memory chip, comprising:
   an image processing circuit, comprising:
   a first channel and a second channel, the first channel and the second channel sharing an input port, wherein the first channel processes first image data to generate first processed image data, and the second channel processes second image data to generate second processed image data; and
   a compression circuit, configured to compress the first processed image data and the second processed image data to generate first compressed image data and second compressed image data, respectively;
   wherein a memory block in the memory chip is configured as a ring buffer, which is shared by the first channel and the second channel to store the first compressed image data and the second compressed image data,
   wherein the image processing circuit further comprises:
   a write direct memory access (WDMA) circuit, coupled between the compression circuit and the ring buffer, and configured to write the first compressed image data and the second compressed image data to the ring buffer;
   wherein the WDMA circuit establishes a write data table comprising a plurality of entries, each of which records information of one set of data written to the ring buffer.

2. The video processing circuit of claim 1, wherein the set of data is compressed image data corresponding to a frame in the first compressed image data or the second compressed image data, and each entry comprises a starting address of the set of data in the ring buffer, a size of the set of data, a frame index corresponding to the frame, and a channel index indicative of the first channel or the second channel.

3. The video processing circuit of claim 2, wherein each entry further comprises a status of the set of data, the status of the set of data indicative of whether the WDMA circuit is currently writing the set of data to the ring buffer or has successfully written the set of data to the ring buffer.

4. The video processing circuit of claim 1, further comprising:
   a back-end circuit, configured to read the first compressed image data or the second compressed image data from the ring buffer for processing;
   wherein the write data table is stored in a first register, and the back-end circuit receives data of the entries of the write data table by a second register so as to accordingly access the ring buffer;
   wherein the second register and the first register are provided with an exclusive line in between to connect the second register and the first register.

5. The video processing circuit of claim 4, wherein a number of storage units of the second register is less than a number of storage units of the first register.

6. The video processing circuit of claim 4, wherein the image processing circuit further comprises:
   a multiplexer, configured to transmit data of a corresponding entry of the plurality of entries in the write data table to the second register according to a selection signal.

7. The video processing circuit of claim 4, wherein the back-end circuit is a video encoder.

8. A video processing method, applied to a video processing circuit coupled to a memory chip, the video processing method comprising:
   processing first image data by a first channel of an image processing circuit of the video processing circuit to generate first processed image data, and processing second image data by a second channel of the image processing circuit to generate second processed image data, wherein the first channel and the second channel share an input port;
   compressing the first processed image data and the second processed image data to generate first compressed image data and second compressed image data, respectively;
   storing the first compressed image data and the second compressed image data to a ring buffer;
   wherein a memory block in the memory chip is configured as the ring buffer, which is shared by the first channel and the second channel to store the first compressed image data and the second compressed image data; and
   establishing a write data table comprising a plurality of entries, each of which records information of one set of data written to the ring buffer.

9. The video processing method of claim 8, wherein the set of data is compressed image data corresponding to a frame in the first compressed image data or the second compressed image data, and each entry comprises a starting address of the set of data in the ring buffer, a size of the set of data, a frame index corresponding to the frame, and a channel index indicative of the first channel or the second channel.

10. A video processing method, applied to a video processing circuit coupled to a memory chip, the video processing method comprising:
   processing first image data by a first channel of an image processing circuit of the video processing circuit to generate first processed image data, and processing second image data by a second channel of the image processing circuit to generate second processed image data, wherein the first channel and the second channel share an input port;
   compressing the first processed image data and the second processed image data to generate first compressed image data and second compressed image data, respectively;
   storing the first compressed image data and the second compressed image data to a ring buffer;
   wherein a memory block in the memory chip is configured as a ring buffer, which is shared by the first channel and the second channel to store the first compressed image data and the second compressed image data; and reading the first compressed image data or the second compressed image data from the ring buffer by a back-end circuit for processing;

wherein a write data table is stored in a first register, and the back-end circuit receives data of entries of the write data table by a second register so as to accordingly access the ring buffer;

wherein the second register and the first register are provided with an exclusive line in between to connect the second register and the first register.

11. The video processing method of claim 10, wherein a number of storage units of the second register is less than a number of storage units of the first register.

* * * * *